May 19, 1942.  H. BANY  2,283,662
EXCITATION CONTROL SYSTEM
Filed June 7, 1940
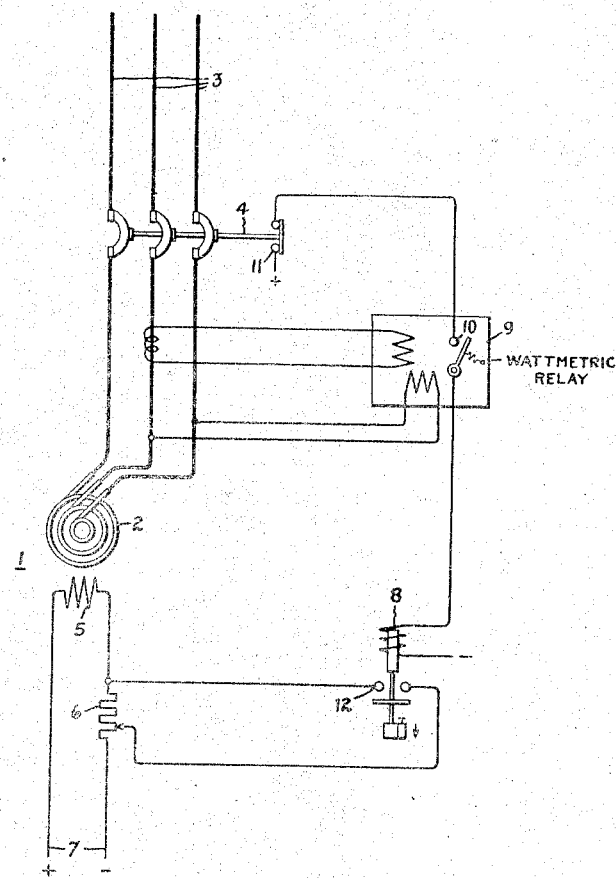
Inventor:
Herman Bany,
by Harry E. Dunham
His Attorney.

Patented May 19, 1942

2,283,662

UNITED STATES PATENT OFFICE 2,283,662

EXCITATION CONTROL SYSTEM

Herman Bany, Lansdowne, Pa., assignor to General Electric Company, a corporation of New York Application June 7, 1940, Serial No. 339,313

2 Claims. (Cl. 172—274)

My invention relates to excitation control systems and particularly to systems for increasing the excitation of a synchronous machine, such as a synchronous motor, a predetermined amount when the load connected to the machine is above a predetermined value, and one object of my invention is to provide a new and improved arrangement of apparatus for effecting such an increase in the excitation of a synchronous machine while the load connected thereto is above a predetermined value.

My invention will be better understood from the following description when taken in connection with the accompanying drawing the single figure of which illustrates diagrammatically a synchronous motor excitation control system embodying my invention, and its scope will be pointed out in the appended claims.

Referring to the drawing, 1 represents a synchronous motor the armature winding 2 of which is connected to a three-phase supply circuit 3 by suitable switching means 4. The field winding 5 of the motor 1 and a suitable current limiting device, such as an adjustable resistor 6, are normally connected in series across a suitable source of excitation 7. In order to increase the excitation of the motor 1 when the load connected thereto is above a predetermined value, the resistor 6 is arranged to be short-circuited by suitable switching means shown as a contactor 8. The contactor 8 in turn is controlled by a wattmetric relay 9, which is connected to the armature circuit of the motor 1 so that it is energized in response to the power flowing between the supply circuit 3 and the armature winding 2 of the motor 1. The wattmetric relay 9 is arranged, in any suitable manner, so that it maintains its contacts 10 open until the power supplied by the supply circuit 3 to the motor 1 exceeds a predetermined value. The contacts 10 are connected in an energizing circuit for the operating coil of the contactor 8. This energizing circuit also includes auxiliary contacts 11 on the switching means 4 which are arranged to be closed when the switching means is closed to connect the supply circuit 3 to the motor armature winding 2. Preferably the contactor 8 is of the well known time delay drop out type so that it maintains its contacts 12 closed for a predetermined time after the operating coil of the contactor is deenergized in order to prevent rapid pumping of the contactor on fluctuating loads.

The operation of the arrangement shown in the drawing is as follows:

As long as the amount of power supplied to the armature winding 2 is below a predetermined value so that the contacts 10 of the wattmetric relay 9 are open, the resistor 6 limits the exciting current of the motor to its normal value. When, however, the load on the motor increases to a sufficient value to cause the wattmetric relay 9 to close its contacts 10, an energizing circuit is completed for the operating coil of the contactor 8 so that the contactor 8 closes its contacts 12 and completes a shunt circuit around the resistor 6. In this manner the excitation of the motor is increased a predetermined amount so as to increase the synchronizing torque of the motor and thereby increase the amount of load the motor can drive without falling out of step.

When the load again decreases to a sufficiently low value to effect the opening of the contacts 10 of the wattmetric relay 9, the contactor 8 becomes deenergized and, after a predetermined time interval, opens its contacts 12 so as to remove the short-circuit from around the resistor 6 and thereby restore the excitation of the synchronous motor to its normal value.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current supply circuit, a synchronous machine supplied with current from said circuit, and means responsive to the amount of power supplied from said circuit to said machine for immediately increasing the excitation of said machine a predetermined amount when the load on said machine exceeds a predetermined amount and for decreasing after a predetermined time interval the excitation of said machine a predetermined amount when the load on said machine decreases below a predetermined amount.

2. In combination, an alternating current supply circuit, a source of excitation, a synchronous machine having an armature winding supplied with current from said circuit and a field winding connected to said source, and means for immediately increasing the excitation of said machine a predetermined amount when the load on said machine exceeds a predetermined amount and for decreasing after a predetermined time interval the excitation of said machine a predetermined amount when the load on said machine decreases below a predetermined amount including a resistor in series with said field winding and said source, a switch for shunting a portion of said resistor, means for delaying the opening of said switch, and means responsive to the amount of power supplied from said circuit to said armature winding for effecting the closing of said switch when the load on said machine exceeds a predetermined amount and the opening of said switch when the load on said machine decreases below a predetermined amount.

HERMAN BANY.